(12) United States Patent
Potter

(10) Patent No.: US 8,464,802 B2
(45) Date of Patent: Jun. 18, 2013

(54) HYDRAULIC-PNEUMATIC THIRD POINT CONNECTOR

(75) Inventor: Jay E. Potter, Springdale, AR (US)

(73) Assignee: Tri Trac Innovations, Inc., Fayetteville, AR (US)

( * ) Notice: Subject to any disclaimer, the term of this patent is extended or adjusted under 35 U.S.C. 154(b) by 0 days.

(21) Appl. No.: 12/613,747

(22) Filed: Nov. 6, 2009

(65) Prior Publication Data

US 2010/0300712 A1    Dec. 2, 2010

Related U.S. Application Data

(60) Provisional application No. 61/180,928, filed on May 26, 2009.

(51) Int. Cl.
*A01B 63/10* (2006.01)
(52) U.S. Cl.
USPC .......................................................... 172/439
(58) Field of Classification Search
USPC .................... 172/439; 91/4 R, 4 A
See application file for complete search history.

(56) References Cited

U.S. PATENT DOCUMENTS

| | | | | |
|---|---|---|---|---|
| 1,290,265 A * | 1/1919 | McEntire | ........................ | 91/4 R |
| 2,405,980 A * | 8/1946 | Sands et al. | ..................... | 172/11 |
| 2,827,186 A * | 3/1958 | Waite | ........................... | 414/718 |
| 3,002,743 A | 10/1961 | Sampietro | | |
| 3,053,233 A * | 9/1962 | Mead | ............................... | 92/79 |
| 3,234,853 A * | 2/1966 | Aber | ................................ | 91/4 R |
| 3,507,189 A * | 4/1970 | Beckett et al. | ................. | 91/4 R |
| 3,905,425 A * | 9/1975 | Jackson | ........................ | 172/321 |
| 4,031,966 A * | 6/1977 | Farrell | ........................... | 172/794 |
| 4,191,280 A * | 3/1980 | Copperwheat | ............... | 188/300 |
| 4,336,954 A | 6/1982 | Orvis | | |
| 4,387,910 A * | 6/1983 | van der Lely | ................ | 280/449 |
| 6,311,961 B1 | 11/2001 | Julia | | |
| 7,207,259 B2 * | 4/2007 | Binetti Pozzi et al. | ......... | 91/4 R |

OTHER PUBLICATIONS

PCT/US2010/033099 International Search Report dated Jul. 2, 2010, pp. 1-7.

* cited by examiner

*Primary Examiner* — Thomas B Will
*Assistant Examiner* — Joel F. Mitchell
(74) *Attorney, Agent, or Firm* — Merek, Blackmon & Voorhees, LLC

(57) ABSTRACT

A connector for use in as a third point connector for a tractor has a hydraulic and pneumatic chamber for providing an easy method to adjust the length of the third point connector to thereby change the angle between the tractor and an attached implement. When a release valve is opened, the two sides of the connector can be moved towards or away from each other as air enters from the environment or exits as needed to balance the pressure inside the connector. An induced air pocket in the hydraulic chamber allows for a slight cushion against the forces as the incompressible hydraulic fluid prevents larger swings in the length of the connector. One or more of the opposing ends may have threaded connectors to allow for general size changes to the connector.

11 Claims, 3 Drawing Sheets

HYDRAULIC-PNEUMATIC THIRD POINT CONNECTOR

CROSS REFERENCE TO RELATED APPLICATIONS

This application claims the benefit of U.S. Provisional Application 61/180,928, filed May 26, 2009, entitled Hydraulic-Pneumatic Third Point Connector, which is incorporated herein by reference.

BACKGROUND OF THE INVENTION

1. Field of the Invention

The present application relates to a system and method for providing an easily adjustable connector having a hydraulic and pneumatic chamber.

A connector for use in for example as a third point connector for a tractor has a hydraulic and pneumatic chamber for providing an easy method to adjust the length of the third point connector to thereby change the angle between the tractor and an implement attached to the tractor. By using a hydraulic and pneumatic chamber, the overall length of the connector can be rapidly changed without adding or subtracting hydraulic fluid. When a release valve is opened, the two sides of the connector can be moved towards or away from each other as air enters from the environment or exits as needed to balance the pressure inside the connector. With the valve closed, changes in the length of the connector are resisted as a change the pressure inside the chamber that would result from the change in the size of the inner chamber are countered by the incompressible hydraulic fluid. The small amount of air does allow for a slight cushion against the forces as the incompressible hydraulic fluid prevents larger swings in the length of the connector. One or more of the opposing ends may have threaded connectors to allow for general size changes to the connector, that is the threaded connector sets an overall length about which the hydraulic chamber provides a range of lengths.

2. Description of the Prior Art

Accordingly, it is a principal object of a preferred embodiment of the invention to provide an improved connector having a hydraulic and pneumatic chamber.

It is another object of the invention to provide an improved third point connector having an easily adjustable length.

It is a further object of the invention to provide an improved third point connector having a release valve for selectively allowing or preventing changes in length of the third point connector.

Still another object of the invention is to provide an improved third point connector having a release valve for selectively allowing or preventing a piston from moving relative to the third point connector within a hydraulic chamber to allow or prevent changes in the length of the third point connector.

Still another object of the invention is to provide an improved third point connector having pneumatic chamber within or in communication with the hydraulic chamber to act as a shock absorber to protect devices attached to the third point connector.

It is yet another object of the invention to provide an improved third point connector having pneumatic chamber connecting opposite sides of a hydraulic chamber to allow small corrections to the length of the piston to cushion devices attached about the connector.

It is an object of the invention to provide improved elements and arrangements thereof in an apparatus for the purposes described which is inexpensive, dependable and fully effective in accomplishing its intended purposes.

These and other objects of the present invention will be readily apparent upon review of the following detailed description of the invention and the accompanying drawings. These objects of the present invention are not exhaustive and are not to be construed as limiting the scope of the claimed invention. Further, it must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

BRIEF DESCRIPTION OF THE DRAWINGS

Similar reference characters denote corresponding features consistently throughout the attached drawings.

DETAILED DESCRIPTION OF THE PREFERRED EMBODIMENT(S)

The present invention according to at least one aspect is to a novel third point connector for a tractor or the like having both an adjustable length and providing shock absorption characteristics.

Figure 1:
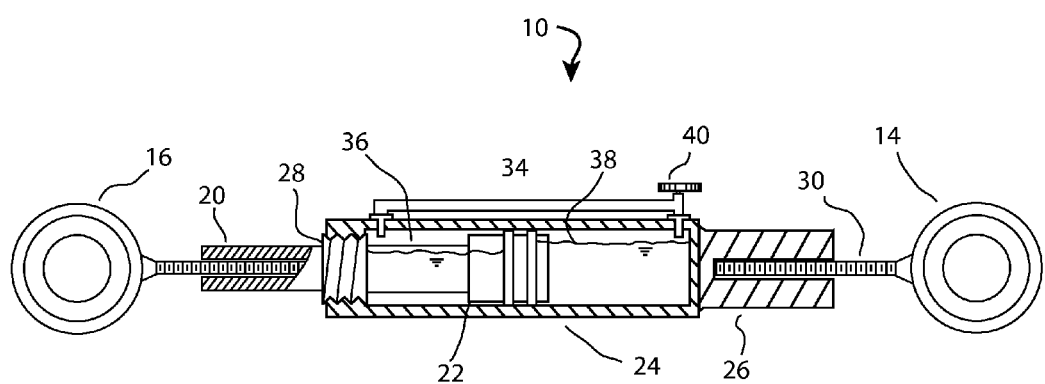
FIG. 1 is a partial cross sectional view of a pneumatic hydraulic third point connector according to one aspect of the invention.
Figure 2:
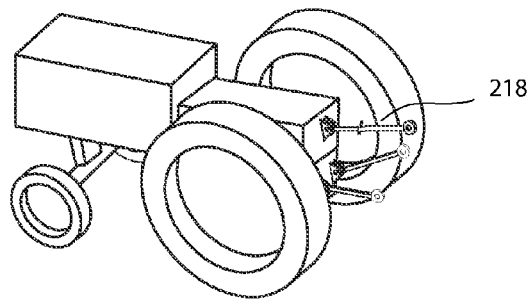
FIG. 2 is a diagrammatic view of a prior art tractor having a third point connector including a turn buckle.
Figure 3:
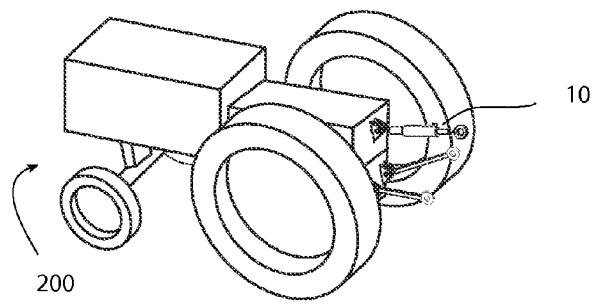
FIG. 3 is a diagrammatic view of the prior art adjustable, threaded connector of FIG. 2.
Figure 4:
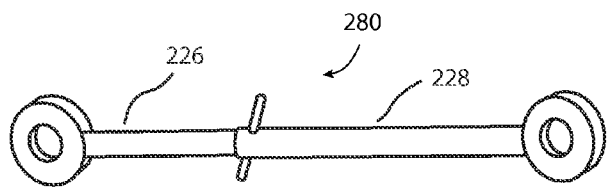
FIG. 4 is a diagrammatic view of a tractor having a third point connector according to an aspect of the present invention.
Figure 5:
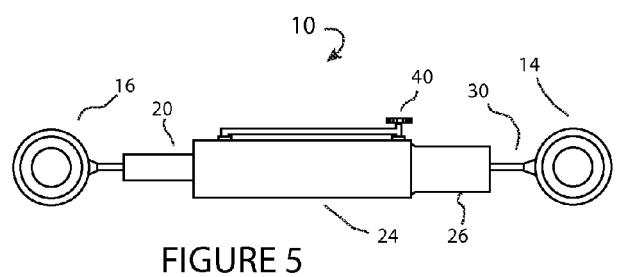
FIG. 5 is a diagrammatic view of the third point connector according to an aspect of the present invention.
Figure 7:
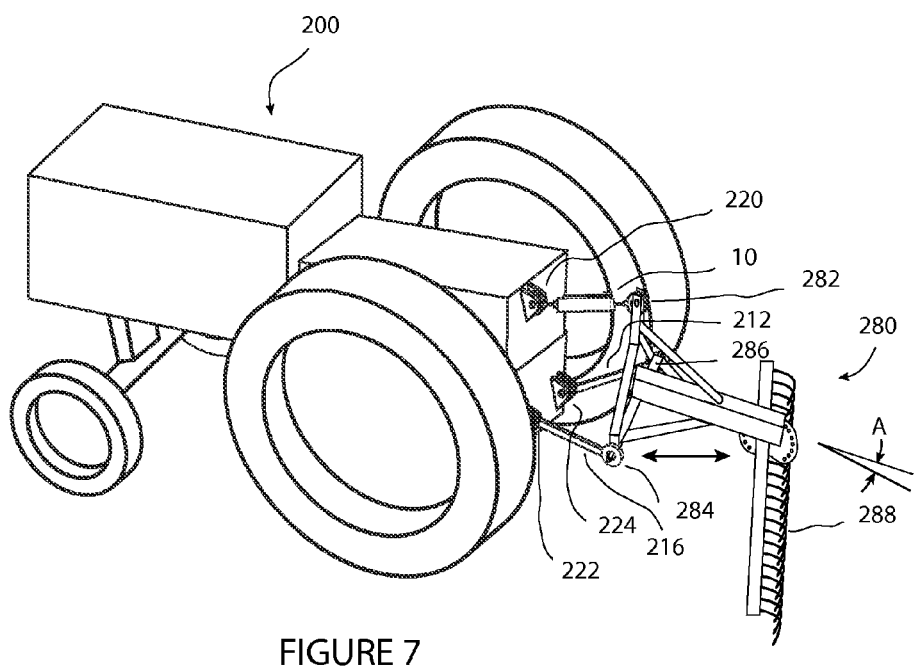

FIG. 1 shows a pneumatic hydraulic third point connector 10 according to at least one aspect of the present invention. Prior art tractors 200 use a three point connector to connect various attachments ("implements") to the tractor. For simplicity, much of the actual hardware of the tractor has been removed. FIG. 7 shows one such implement 280 for use with the tractor 200.

In prior systems two fixed links 212,216 and one adjustable link 218 were pinned between three attachment points on the tractor 220,222,224 and like attachment points on the attachment 282,284,286. To adjust the relative angle of the implement with the tractor, it was necessary to the use a turnbuckle (not shown) or other threaded links 226,228 of the third point connect 218 to lengthen or shorten the third point connector. Since the two bottom links 212,216 are fixed and the third link 218 is adjustable the attitude of the implement can be adjusted relative to the tractor. This is necessary to maintain the blades 288 in proper relation to the ground or to adjust for variations in the ground or to set the desired depth of penetration of the blades.

Due to the length of service of implements or for other reasons, the threadedly adjustable third point connectors often become corroded, rusted or otherwise fouled. It is often necessary to use a pipe wrench or cheater bar just to adjust the third point connector. Typically the implement is moved a small amount, the third point connector is adjusted, then the process is repeated until the implement is inched towards the correct spot. An additional drawback of the system is that once set in an angular orientation, the implement does not have any play in its orientation to the ground or other work area being manipulated by the implement often meaning that frequent stops are necessary to adjust the implement in proper relation to the ground. Often the relationship must be maintained in tightly controlled relationship to prevent implements from penetrating too far into the ground and "digging" or not penetrating far enough into the ground and climbing or skipping over the ground.

The present invention resolves these issues by combining several desirable qualities into a replacement third point connector. Referring to FIG. 1, the connector 10 includes two eyelets 14, 16. A first length 20 of the connector 10 is attached to a piston 22 inside a cylinder 24 of a second length 26 of the connector. Appropriate plugs or seals 28 are provided to keep an amount of hydraulic fluid inside the cylinder 24. The eyelets 16 are preferably threadedly attached 30 to the first and second lengths of the connectors to provide a more readily adjustable overall length of the connector to fit various purposes and implements.

The piston slides within the cylinder and has an amount of hydraulic fluid on both sides of the piston. An additional chamber or connecting channel 34 is provided in parallel to the cylinder 24. The channel is preferably located above the cylinder to maintain an air pathway for air provided above the hydraulic fluid (or other liquid). A valve such as a threaded plug is connected to selectively close off communication between the chambers 36,38. When the passageway is closed, the piston is prevented from easily traveling back and forth under the combined pressure of the hydraulic fluid and the pneumatic fluid is the closed chambers. When the passageway is opened by, for example, unthreading the valve using handle 40 to unstop the passageway, the air can travel between chamber 36 and 38 via the channel 34. This allows the piston to move along the cylinder pushing the air from one side of the piston to the other through the channel.

The amount of air in the hydraulic chambers 36,38 will help control the amount of slack ("slop") in the connector. In other words, the more air, the more give the connector will have and the more shock the connector will exhibit, since the air is compressible and the hydraulic fluid is not. With a smaller air pocket defined in the hydraulic chamber or pneumatic chamber, the connector will hold its length more steady under the push and pull of the implement attached to maintain the orientation of the implement. While the amount of air desired will depend on the size ("scale") of the implement, it has been found in a 4 ounce chamber that about 2.5 ounces of fluid is ideal, though using half of a chamber of fluid (2 ounces) to three quarters (3 ounces) may be used in various circumstances depending on the shock absorption characteristics or rigidity required for a particular application. In general, about two thirds hydraulic fluid has been found to be the most preferable for the particular application.

Figure 6:
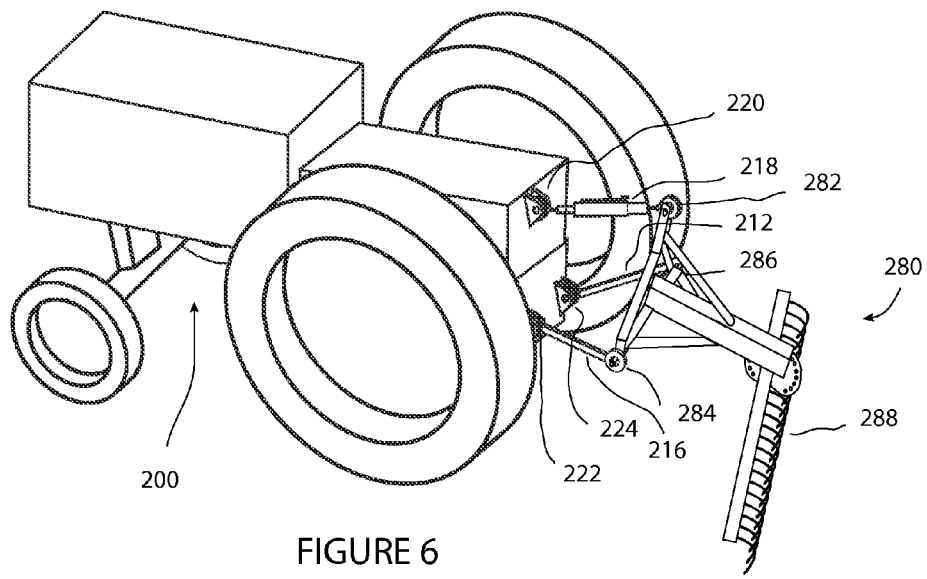
FIGS. 6-7 show the tractor of FIG. 4 with an attachment shown in various angular relationships to the tractor.

In operation, when an implement such as the blades shown in FIGS. 6 and 7 needs to be adjusted, the handle 40 is unthreaded to allow the implement to drop to the ground or allowing a stand or other device to connect the implement to the ground or other stationary surface. With the valve open, the third point connector can extend or extract freely as the piston moves shuttling the air from one chamber to the other. With the implement fixed and secured in place, the tractor can be inched forwards or backwards relative to the implement until the angle of the implement is in the proper orientation. The valve can then be closed to prevent the piston from freely moving within the chamber, thus fixing the length of the third point connector and thus the angular relation of the tractor and implement. For example, between FIGS. 6 and 7, the length of the connector has been shorted to move the orientation of the implement an angle A.

The tractor can then manipulate the implement by for example pulling the blades across an area of ground. If the inner chamber only had an amount of hydraulic fluid around the piston, then the angle between the tractor and the implement would remain fixed since the incompressible fluid would not allow the piston to travel back and forth. However, an amount of air or other gas in the chamber allows a controllable amount of flex to the system. Since air is compressible, if the implement hits a root, rock or other such device, the closed pneumatic chamber acts as a shock absorber to allow some flex in the length of the third point connector 10 to allow the implement to "bounce" over the implement and return quickly to the proper orientation. This flexibility avoids the necessity of stopping frequently to adjust the angular orientation of the implement for minor variations in the ground level or quality. The building pressure of air caused by the piston allows the implement to spring back into position quickly and with less shock than using the current, solid third point connector. For typical implementations, it is sufficient to have a half inch of travel of the implement allowed by the pneumatic shock absorber.

In practice, the size of the pass through channel 34 may be expanded or reduced to change the rate of passage through the channel to control the amount of flex in the system and to provide dampening effects as well. The valve 40 may also be partially opened to control the rate of change in the system. The amount of pressure of the air or gas in the system may also be controlled to limit the amount of travel of the piston under a particular amount of force of the implement.

The device may also be quickly retrofitted to current tractors by simply unpinning the present third point connector at the eyelets and substituting in the present invention as shown in FIGS. 2-5. Additionally, it may be possible to reuse the eyelets of the prior art connector on the present invention by pinning or threading the eyelets onto the body of the current invention.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims. It is therefore to be understood that the present invention is not limited to the sole embodiment described above, but encompasses any and all embodiments within the scope of the following claims.

I claim:

1. A method of adjusting the relative orientation between a tractor having a three point connector and an implement attached to the three point connector, comprising:

providing at least one of the three point connectors with a hydraulic chamber enclosing a hydraulic piston chamber;

providing a piston fluidly separating the hydraulic chamber into two opposing pressure chambers on opposite sides of the piston, said two opposing chambers sealed from each other by the piston, and said piston being selectively slidable within the hydraulic chamber;

providing a first eyelet attached at one ends of the hydraulic chamber;

providing a second eyelet attached to a rod attached to said piston;

providing a pneumatic chamber connected in parallel with and external to said piston chamber, wherein a first end of said pneumatic chamber is connected to and in fluidic communication with a first of said two opposing pressure chambers and said second end of said pneumatic chamber is connected to and in fluidic communication with a second of said two opposing pressure chambers to selective allow passage of fluid between said first and second opposing pressure chambers;

providing a relief valve on the pneumatic chamber in between said first end of the pneumatic chamber and said second end of the pneumatic chamber, said relief valve having a first position for blocking fluid communication between the two opposing chambers through the pneumatic chamber to trap said piston about a first piston position within the piston chamber when pressure within said two opposing chambers is equalized;

said relief valve having a second position for selectively equalizing pressure in said pneumatic chamber opposing pressure chamber of the hydraulic chamber to release the piston from the trapped first piston position so that fluid can flow between the two opposing chambers as the piston is moved away from the first position to equalize pressure in the two opposing pressure chambers;

providing hydraulic fluid in the hydraulic chamber in an amount less than the total volume of the hydraulic chamber to define a limited air pocket in each of the opposing pressure chambers, providing at least one air pocket in each of said opposing pressure chambers devoid of hydraulic fluid to dampen impacts from the first eyelet to the second eyelet;

resting the implement on a surface external to the tractor with said three point connector second eyelet at a first distance from the first eyelet;

manually moving the relief valve from the first position to the second position within the pneumatic chamber to allow the pressure in the two opposing chambers to equalize when the piston slides within the piston chamber;

positioning the tractor relative to the implement to alter the length of the three point connector by moving said three point connector second eyelet to a second distance from the first eyelet not equal to the first distance until the implement is in the proper orientation relative to the tractor; and closing the valve to selectively lock the piston about a second position within the hydraulic chamber with the opposing hydraulic chambers in equal pressure to lock the three point connector with a neutral position having said second eyelet at the second distance from the first eyelet, wherein when said piston is in said second position, air pockets within said opposing chambers allow for external forces from said implement acting on said eyelets to cause said piston to compress a one of the air pockets to dampen forces between the eyelets while said hydraulic fluid prevents said piston from traveling all the way to either end of said piston chamber under the external forces when said relief valve is closed, and wherein pressure in said air pockets automatically biases the piston to return to its second position when the external forces are lessened between said eyelets.

2. The method of claim 1, wherein the amount of hydraulic fluid is less than the total volume of the hydraulic chamber.

3. The method of claim 1, wherein the amount of hydraulic fluid is less than the total volume of the hydraulic chamber, and an air chamber is formed in a portion of the area of the hydraulic chamber not occupied by hydraulic fluid.

4. The method of claim 1, wherein the amount of hydraulic fluid is less than two thirds of the total volume of the hydraulic chamber, and an air chamber is formed in a portion of the area of the hydraulic chamber not occupied by hydraulic fluid.

5. The method of claim 1, wherein the amount of hydraulic fluid is less than three quarters of the total volume of the hydraulic chamber, and an air chamber is formed in a portion of the area of the hydraulic chamber not occupied by hydraulic fluid.

6. The method of claim 1, wherein the amount of hydraulic fluid is more than half of the total volume of the hydraulic chamber, and an air chamber is formed in a portion of the area of the hydraulic chamber not occupied by hydraulic fluid.

7. The method of claim 1, wherein the pneumatic chamber is a cylindrical tube connected from said first opposing pressure chamber to said second opposing pressure chamber.

8. The method of claim 1, wherein only air is transferred between the opposing pressure chambers to equalize pressures in the opposing chambers when the relief valve is released.

9. A method of adjusting the relative orientation between a tractor having a three point connector and an implement attached to the three point connector, consisting essentially of:

providing at least one of the three point connectors with a hydraulic chamber enclosing a hydraulic piston chamber;

providing a piston fluidly separating the hydraulic chamber into two opposing pressure chambers on opposite sides of the piston, said two opposing chambers sealed from each other by the piston, and said piston being selectively slidable within the hydraulic chamber;

providing a first eyelet attached at one ends of the hydraulic chamber;

providing a second eyelet attached to a rod attached to said piston;

providing a pneumatic chamber connected in parallel with and external to said piston chamber, wherein a first end of said pneumatic chamber is connected to and in fluidic communication with a first of said two opposing pressure chambers and said second end of said pneumatic chamber is connected to and in fluidic communication with a second of said two opposing pressure chambers to selective allow passage of fluid between said first and second opposing pressure chambers;

providing a relief valve on the pneumatic chamber in between said first end of the pneumatic chamber and said second end of the pneumatic chamber, said relief valve having a first position for blocking fluid communication between the two opposing chambers through the pneumatic chamber to trap said piston at a first piston position within the piston chamber when pressure within said two opposing chambers is equalized;

said relief valve having a second position for selectively equalizing pressure in said pneumatic chamber opposing pressure chambers of the hydraulic chamber to release the piston from the trapped first piston position so that fluid can flow between the two opposing chambers as the piston is moved away from the first position to equalize pressure in the two opposing pressure chambers;

providing hydraulic fluid in the hydraulic chamber in an amount less than the total volume of the hydraulic chamber to define a limited air pocket in each of the opposing pressure chambers, providing at least one air pocket in each of said opposing pressure chambers devoid of hydraulic fluid to dampen impacts from the first eyelet to the second eyelet;

resting the implement on a surface external to the tractor with said three point connector second eyelet at a first distance from the first eyelet;

manually moving the relief valve from the first position to the second position within the pneumatic chamber to allow the pressure in the two opposing chambers to equalize when the piston slides within the piston chamber;

positioning the tractor relative to the implement to alter the length of the three point connector by moving said three point connector second eyelet to a second distance from the first eyelet not equal to the first distance until the implement is in the proper orientation relative to the tractor; and closing the valve to selectively lock the piston in place within the hydraulic chamber with the opposing hydraulic chambers in equal pressure to lock the three point connector with a neutral position having said second eyelet at the second distance from the first eyelet;

wherein when said piston is in said second position, air pockets within said opposing chambers allow for external forces from said implement acting on said eyelets to cause said piston to compress a one of the air pockets to dampen forces between the eyelets, and for pressure in said air pockets to automatically bias the piston to return to its second position when forces are lessened between said eyelets.

10. The method of adjusting the relative orientation between a tractor having a of claim 9, where said first eyelet is threadedly connected to said hydraulic chamber.

11. The method of adjusting the relative orientation between a tractor having a of claim 9, where said first and second eyelets are threadedly connected to said hydraulic chamber.

* * * * *